(12) United States Patent
Burr et al.

(10) Patent No.: US 9,534,385 B2
(45) Date of Patent: Jan. 3, 2017

(54) ROOM DELIMITATION ELEMENT (71) Applicant: DIEHL COMFORT MODULES GMBH, Hamburg (DE)

(72) Inventors: Reinhold Burr, Heidenheim (DE); Axel Emmerich, Hamburg (DE)

(73) Assignee: DIEHL COMFORT MODULES GMBH, Hamburg (DE)

( * ) Notice: Subject to any disclaimer, the term of this patent is extended or adjusted under 35 U.S.C. 154(b) by 0 days.

(21) Appl. No.: 14/879,514

(22) Filed: Oct. 9, 2015

(65) Prior Publication Data

US 2016/0102455 A1    Apr. 14, 2016

(30) Foreign Application Priority Data

Oct. 11, 2014  (DE) .......................... 10 2014 015 084

(51) Int. Cl.
| | | |
|---|---|---|
| *E06B 5/20* | (2006.01) | |
| *E04C 2/52* | (2006.01) | |
| *E04B 2/02* | (2006.01) | |
| *E04B 2/00* | (2006.01) | |
| *B64C 1/14* | (2006.01) | |
| *B64D 11/00* | (2006.01) | |
| *F24F 13/08* | (2006.01) | |
| *G10K 11/16* | (2006.01) | |
| *B64D 11/02* | (2006.01) | |

(52) U.S. Cl.
CPC ................ *E04C 2/523* (2013.01); *B64C 1/14* (2013.01); *B64C 1/1407* (2013.01); *B64D 11/00* (2013.01); *B64D 11/02* (2013.01); *E04B 2/02* (2013.01); *E04C 2/46* (2013.01); *F24F 13/08* (2013.01); *G10K 11/16* (2013.01)

(58) Field of Classification Search
CPC .............. E06B 5/20; E06B 5/125; E06B 5/12; E06B 5/14; E06B 7/20; E04C 2/523; E04C 2/46; E04B 2/02; E04B 1/84
See application file for complete search history.

(56) References Cited

U.S. PATENT DOCUMENTS

| | | | | |
|---|---|---|---|---|
| 2,350,513 A | * | 6/1944 | Leadbetter ................ | E04B 1/86 52/145 |
| 2,595,975 A | * | 5/1952 | Nothdurft ................. | E06B 7/02 160/91 |
| 2,704,504 A | * | 3/1955 | Wilkening ................ | E06B 7/02 181/224 |
| 3,061,056 A | * | 10/1962 | Kodaras .................... | E06B 5/20 181/290 |

(Continued)

FOREIGN PATENT DOCUMENTS

| | | |
|---|---|---|
| DE | 2410170 A1 | 9/1975 |
| DE | 3801733 A1 | 7/1989 |

(Continued)

OTHER PUBLICATIONS

English Abstract of WO 02/23098 A1, dated Mar. 21, 2002.

*Primary Examiner* — Brian Mattei
*Assistant Examiner* — Paola Agudelo
(74) *Attorney, Agent, or Firm* — Scully Scott Murphy and Presser (57) ABSTRACT

The present invention relates to a room delimitation element, in particular to a door or a wall, which may be used for a sanitary room in vehicles or buildings.

8 Claims, 9 Drawing Sheets (56) References Cited

U.S. PATENT DOCUMENTS

| | | | | | |
|---|---|---|---|---|---|
| 3,122,984 | A | * | 3/1964 | Rosenfeld | A62B 13/00 454/195 |
| 3,150,618 | A | * | 9/1964 | Rosenfeld | E06B 5/12 109/1 R |
| 3,295,273 | A | * | 1/1967 | Wehe, Jr. | E06B 3/822 181/292 |
| 3,789,747 | A | * | 2/1974 | Wasserman | F24F 7/08 454/186 |
| 3,963,094 | A | * | 6/1976 | Nowikas | E04B 1/8218 181/198 |
| 4,076,100 | A | * | 2/1978 | Davis | E04B 1/90 181/290 |
| 4,706,422 | A | * | 11/1987 | Ashton | E04B 2/7411 181/284 |
| 5,119,608 | A | * | 6/1992 | Glover | E04C 2/523 52/171.3 |
| 5,901,768 | A | * | 5/1999 | Herbst | E06B 5/003 160/90 |
| D554,243 | S | * | 10/2007 | Harrod | D23/314 |

FOREIGN PATENT DOCUMENTS

| | | | |
|---|---|---|---|
| DE | 60129030 T2 | | 2/2008 |
| JP | 2012026236 A | * | 2/2012 |

* cited by examiner

ROOM DELIMITATION ELEMENT

BACKGROUND OF THE INVENTION

The present invention relates to a room delimitation element, in particular to a door or a wall, which may be used for a sanitary room in vehicles or buildings.

DISCUSSION OF THE PRIOR ART

In order to ensure air exchange which is sufficient in terms of hygiene, sanitary rooms without windows (to the outside which can be opened) typically have to be provided with an extractor for conveying away humid exhaust air and with an incoming air opening for guiding intake air. The incoming air openings have to have a certain available cross section, so that a sufficient amount of fresh air may flow into the sanitary room and that no negative pressure is created in the sanitary room. A simple conventional solution for such incoming air openings are ventilation grills which are attached to through openings at the base of a door. Such ventilation grills are usually devised such that sufficient air flow is enabled on the one hand, and that tightness in terms of sight and light is ensured on the other hand.

In some fields of application, there is a demand for room delimitation elements which additionally have a sound absorption or sound insulation effect. For example, while the majority of flushing noises in the sanitary room in older types of aircraft are drowned out by the operating noise of the aircraft, the noise level within cabins of modern aircraft types is significantly lower, which is why the noises emanating from the sanitary room are perceptible by passengers in the cabin. The acoustic insulation of the sanitary room in modern (commercial) aircraft, for example, which will be even quieter in the future is thus of increasing importance.

SUMMARY OF THE INVENTION

The invention is therefore based on the object of achieving an improved room delimitation element which despite the provision of a sufficient air passage can ensure sufficient acoustic insulation.

This object is achieved by a room delimitation element having the features of claim 1. Particularly preferred design embodiments and refinements of the invention are the subject matter of the dependent claims.

The room delimitation element of the invention has a through opening which in a thickness direction of the room delimitation element extends through the entire room delimitation element, and an insert which is disposed in and/or ahead of the through opening and which in directions which are transverse to the thickness direction of the room delimitation element extends in each case at least across the entire through opening. The insert on its part has at least one air-passage region in the region of the through opening and at least one sound absorption region, wherein the at least one sound absorption region is disposed beside the air-passage region in a direction which is transverse to the thickness direction of the room delimitation element. This at least one sound absorption region has at least one sound absorption element which has a sound absorption effect in a direction which is transverse to the thickness direction of the room delimitation element; and the at least one air-passage region in the thickness direction of the room delimitation element has at least two layers of a plurality of sound reflection elements, wherein the sound reflection elements in one layer are in each case mutually spaced apart in a direction which is transverse to the thickness direction of the room delimitation element and the sound reflection elements in different layers are disposed so as to be mutually offset in a direction which is transverse to the thickness direction of the room delimitation element.

Instead of a conventional ventilation grill, a special insert which unifies the functional features of air permeability and sound absorption is inserted in/ahead of the through opening in the room delimitation element of the invention. In this way, a flow opening having a sufficient available cross section can be provided and, simultaneously, sufficient acoustic insulation can be achieved. Since the sound absorption elements are not disposed in the air-passage region, air flow is not compromised by said sound absorption elements. The sound reflection elements in the air-passage region of the insert permit a sufficient available cross section for air flow. On account of their mutually offset disposal in at least two layers, the sound reflection elements reflect at least part of the sound impacting the insert multiple times between them and also laterally in the direction towards the at least one sound absorption region. Altogether, a sound damping value of 2 to 3 dB(A) and more may be achieved for the relevant frequency range using the insert, preferably at an available cross section of about 200 cm$^2$.

The room delimitation element according to the invention is preferably designed as a door or a wall, in particular a door or a wall of a sanitary room. This door or wall, respectively, is preferably employable in a vehicle (aircraft, watercraft, landcraft) or in a building.

The insert in directions which are transverse to the thickness direction of the room delimitation element extends in each case at least across the entire through opening. That is to say that the insert preferably in at least one direction which is transverse to the thickness direction of the room delimitation element protrudes into a material portion of the room delimitation element which adjoins the through opening. The at least one air-passage region of the insert here is disposed in the region of the through opening. That is to say that the entire air-passage region preferably extends within the through opening of the room delimitation element, but the former may alternatively also be partially positioned outside the through opening, for example for reasons of assembly or design. On the other hand, the room delimitation element has at least one clearance which adjoins the through opening in a direction which is transverse to the thickness direction of the room delimitation element. At least one of the at least one sound absorption regions of the insert is then at least partially disposed within at least one of these at least one clearances. If required, the air-passage region of the insert may also protrude into at least one of these at least one clearances. As opposed to the through opening, the at least one clearance in the thickness direction of the room delimitation element does not extend through the entire room delimitation element but is preferably designed as pocket in a wall of the room delimitation element, which is closed on one or both sides in the thickness direction of the room delimitation element. Alternatively, the sound absorption regions of the insert may also be positioned so as to be completely within the through opening of the room delimitation element.

The term "sound" in this context refers in particular to audible sound, that is to say sound which is audible to the human ear, in a frequency range of about 16 Hz to about 20 kHz. In the context of sanitary rooms the frequency range of about 500 Hz to 8 kHz is particularly relevant. Moreover, the sound is in particular an airborne sound, that is to say sound waves which are disseminated by air. The terms "sound reflection" and "sound absorption" likewise preferably refer to these frequency ranges. This is not intended to exclude that the sound reflection elements and the sound absorption elements alongside the above also may reflect or absorb sound in other frequency ranges, respectively.

The at least one air-passage region has at least two layers of a plurality of sound reflection elements, that is to say a total of at least two sound reflection elements. Preferably, a plurality of sound reflection elements, that is to say at least two sound reflection elements, are provided in each layer. The sound reflection elements of one layer are preferably disposed in one common plane. The plurality of layers preferably run so as to be substantially parallel with one another. The at least two layers are mutually spaced apart in the thickness direction of the room delimitation element. The spacing between two layers which are adjacent in the thickness direction is preferably at least about 10 mm and/or at most about 20 mm, and the clear space between adjacent layers is preferably at least about 10 mm and/or at most about 15 mm, preferably about 11.5 mm, 12.0 mm, or 12.5 mm.

The sound reflection elements of the different layers are disposed so as to be mutually offset in a direction (or a plurality of directions) which is/are transverse to the thickness direction of the room delimitation element. It is ensured in this way that the insert in the thickness direction of the room delimitation element has no rectilinear passage and the sound cannot make its way through the insert in an unobstructed manner.

The sound reflection elements are arbitrary devices which are capable of at least partially reflecting sound in the desired frequency range. The sound reflection elements preferably have a sound transmission rate of up to 0% but may optionally also have sound absorbing properties alongside the sound reflecting properties. The sound reflection elements are preferably configured so as to be substantially plate-shaped. The sound reflection elements are preferably designed so as to be substantially planar, provided with structures, or configured with angular edges. The sound reflection elements are preferably made from a metallic or a plastics material.

The sound absorption elements are arbitrary devices which are capable of at least partially absorbing sound in the desired frequency region. The (main) sound absorption effect of the sound absorption elements runs in a direction which is transverse to the thickness direction of the room delimitation element, preferably in that direction in which the sound absorption region lies beside the air-passage region. The sound absorption elements are preferably made from a material having sound absorbing properties and/or provided with a sound absorbing structure. The sound absorption elements are preferably made from a foamed material, preferably from a closed-cell rigid foam. Bores which run substantially in the direction of the desired sound absorption effect are preferably introduced in the sound absorption elements.

In one preferred design embodiment of the invention at least one of the sound reflection elements in at least one layer is designed and/or disposed in such a manner that said sound reflection element deflects sound in a direction towards a sound absorption element of the at least one sound absorption region.

In one preferred design embodiment of the invention at least one of the sound reflection elements in at least one layer is equipped with a further sound absorption element. The at least one further sound absorption element is preferably formed from an open-cell foam and is attached to a surface of a plate-shaped sound reflection element.

In one further preferred design embodiment of the invention the sound absorption element/elements of the at least one sound absorption region are altogether designed in such a manner that they cause sound absorption in various frequency ranges. A total of a plurality of bores which are of various dimensions and in particular have various bore depths are preferably provided in the sound absorption elements.

In one further preferred design embodiment of the invention the insert has at least one cover element which has a plurality of openings and in the thickness direction of the room delimitation element is disposed on one side of the at least two layers of sound reflection elements. Cover elements are preferably disposed on both sides of the at least two layers of sound reflection elements. The at least one cover element is preferably configured so as to be substantially plate-shaped, preferably designed as a grill element. The at least one cover element is preferably made from a metallic material, preferably from stainless steel. The at least one cover element preferably has sound reflecting properties. The at least one cover element preferably serves as an assembly element for fastening the layers of sound reflection elements and/or of the sound absorption elements and/or is used as a design element.

The at least one cover element preferably protrudes beyond the through opening in at least one direction which is transverse to the thickness direction of the room delimitation element. The insert may be fastened to a wall of the room delimitation element, which adjoins the through opening, with the aid of the cover element in this way.

The subject matter of the invention also includes an air-permeable insert for a through opening in an afore-described room delimitation element of the invention.

BRIEF DESCRIPTION OF THE DRAWINGS

The above and further features and advantages of the invention will be better appreciated on account of the following description of preferred and non-limiting exemplary embodiments by means of the appended drawing, in which, to some extent schematically.

DETAILED DESCRIPTION OF THE INVENTION

Figure 1:
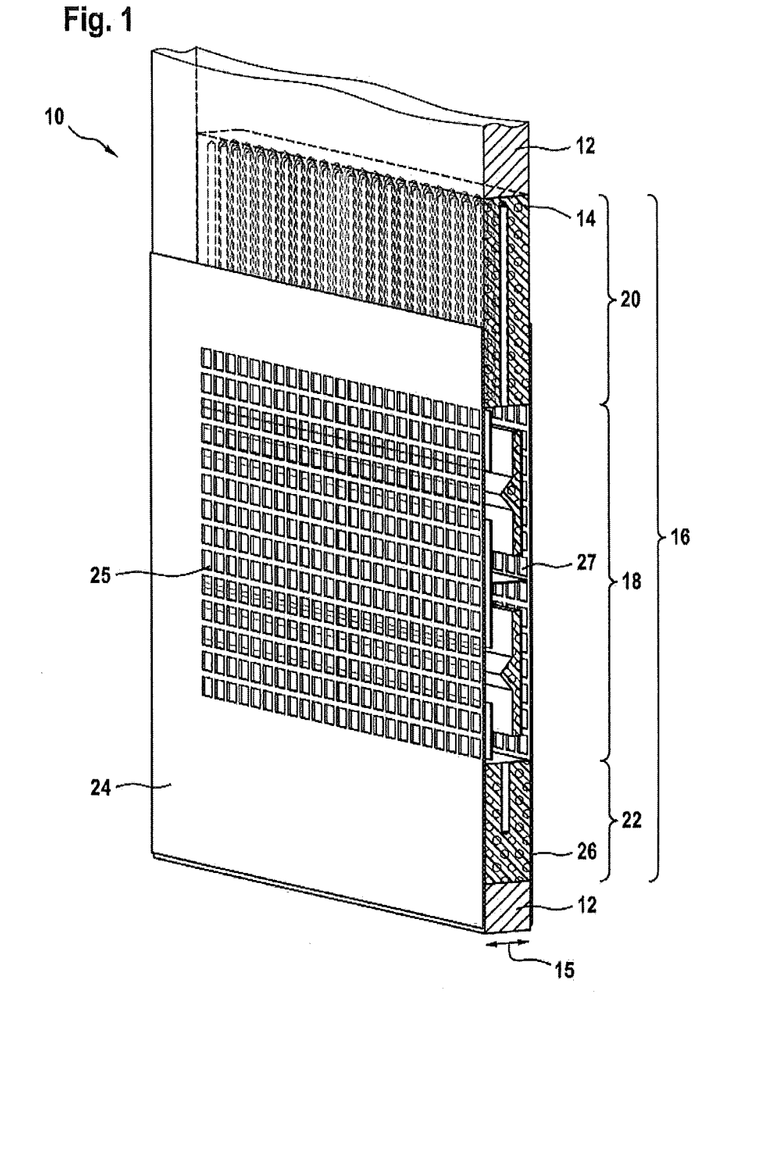
FIG. 1 shows a perspective partial view of a toilet door according to the invention.
Figure 2A:
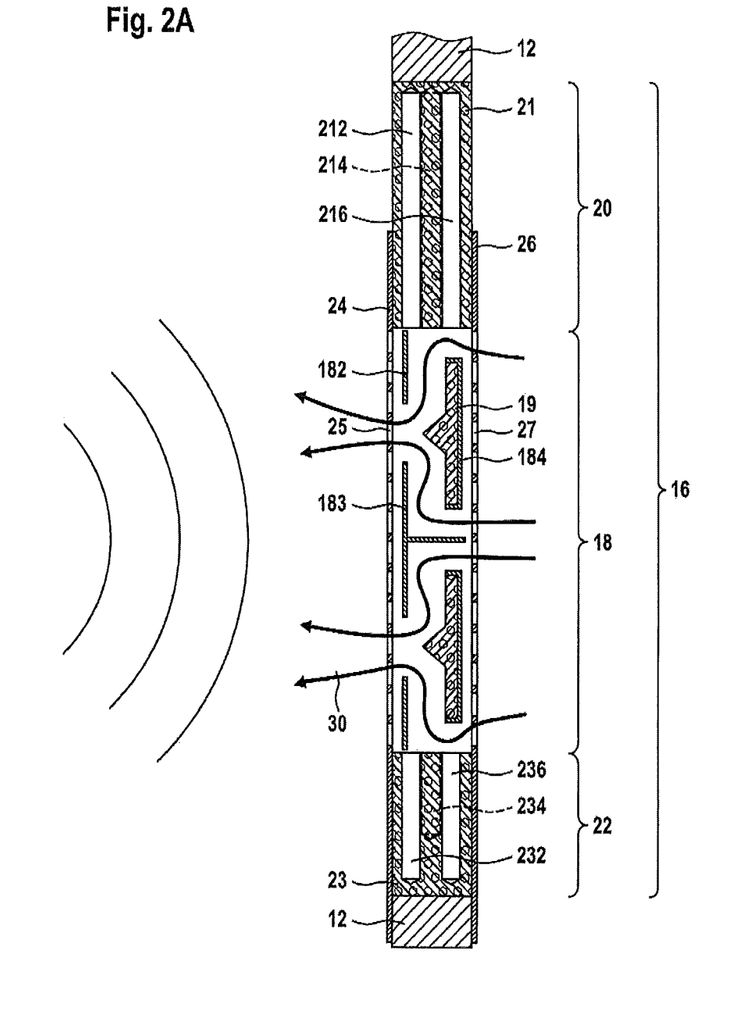
FIG. 2A shows a schematic diagram to visualize the air passage in the toilet door of FIG. 1.
Figure 2B:
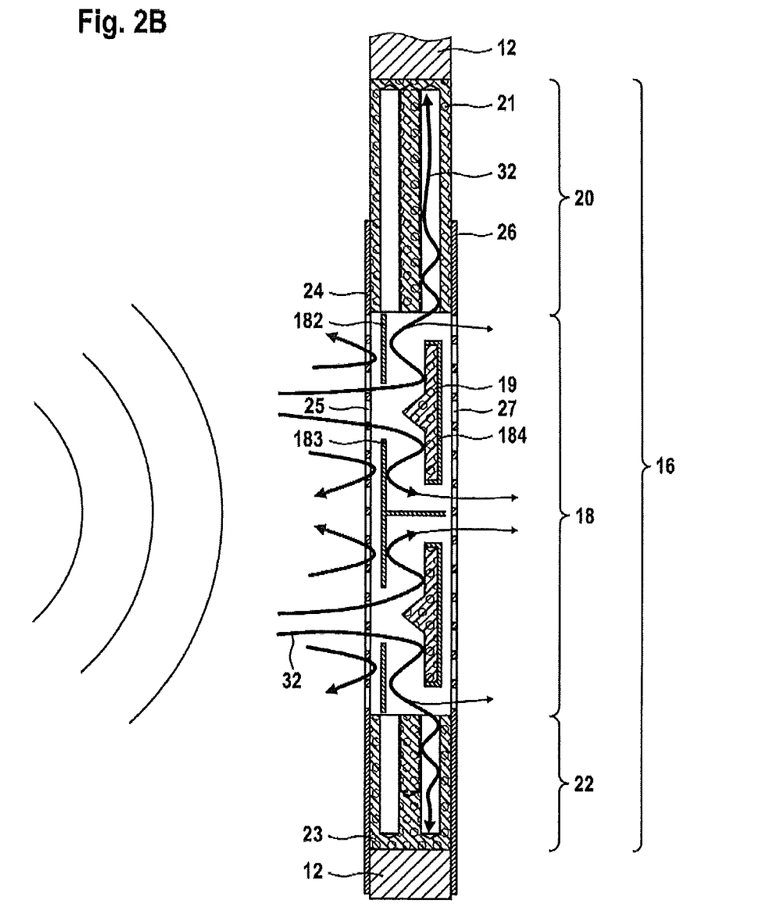
FIG. 2B shows a schematic diagram of sound absorption in the toilet door of FIG. 1.

Referring to FIGS. 1, 2A, and 2B, the basic construction and the basic operating mode of a room delimitation element according to the invention will be explained in more detail first. The room delimitation element here will be explained by way of the example of a door for a sanitary room (a toilet door, for example), for a commercial aircraft, for example, without the invention being limited to this specific application.

The room delimitation element 10 which is designed as a toilet door has a wall 12 which is configured as a door leaf and in which a through opening 14 is configured, preferably close to the floor. The through opening 14 has a substantially rectangular cross section, for example, and in the thickness direction 15 of the room delimitation element 10 extends through the entire room delimitation element 10.

An insert 16 which is designed according to the invention is inserted in this through opening 14. The insert 16 on the one hand ensures an available cross section of about 200 cm², for example, for an air passage, and on the other hand ensures sound absorption having a sound damping value of up to about 2 dB(A) and more for a relevant frequency range of about 500 Hz to 8 kHz. In this way, in particular flushing noises (from vacuum toilets, for example) cannot be perceived outside the sanitary room, or can be perceived only in a highly damped manner.

For this purpose, the insert 16 has an air-passage region 18 which in the vertical direction above and below (generally in a direction which is transverse to the thickness direction 15 of the room delimitation element 10) is in each case adjoined by one sound absorption region 20, 22. The air-passage region 18 of the insert here is preferably disposed completely within the through opening 14, while the sound absorption regions 20, 22 are at least partially received in pocket-type clearances in the room delimitation element 10, which are adjacent to the through opening 14. The upper sound absorption region 20 here may be fixedly integrated in the room delimitation element 10, for example, and the lower sound absorption region 22 may be removable for cleaning purposes and similar. The door leaf 12 adjoins the air-passage region 18 in each case in the horizontal direction, optionally by way of a buffer or the like therebetween.

In the thickness direction 15 of the room delimitation element 10, the insert 16 terminates in each case by way of a stainless-steel grill (layer thickness about 1 mm, for example) as the cover elements 24, 26. The cover elements 24, 26 have in each case a multiplicity of openings 25, 27, so that a sufficiently large available cross section remains for the insert 16. Size, shape, and distribution of the openings 25, 27 of the cover elements 24, 26 may be selected depending on the desired design.

As is visualized in FIGS. 2A and 2B, the air-passage region 18 has a first layer of sound reflection elements 182, 183, and a second layer of sound reflection elements 184. At least two layers of sound reflection elements are generally provided.

The sound reflection elements 182, 183, 184 are from metal or plastics, for example, are designed so as to be substantially plate-shaped, and in each case extend in a plane which is transverse to the thickness direction 15 of the room delimitation element 10. The sound reflection elements 182, 183, 184 have in each case a substantially planar surface, the sound reflection elements 183, 184 moreover having angular edges.

The sound reflection elements 182, 183, or 184, respectively, within one layer are mutually spaced apart, so that openings remain between them. Moreover, the two layers of the sound reflection elements 182, 183, 184 are mutually spaced apart in the thickness direction 15 of the room delimitation element 10, so that a vacant space of about 11 to 14 mm remains, for example.

It is moreover evident in FIGS. 2A and 2B that the sound reflection elements 182, 183 of the first layer, and the sound reflection elements 184 of the second layer are mutually offset in the vertical direction and approximately mutually overlap, such that no rectilinear passage through the insert 16 exists in the thickness direction 15 of the room delimitation element 10, at least not during interaction with the cover elements 24, 26.

The upper sound absorption region 20 has a sound absorption element 21 from a foam material, for example a closed-cell rigid foam. The sound absorption element 21 here directly adjoins the door leaf 12, or is at least partially received in a clearance in the door leaf 12, which adjoins the through opening 14, respectively. One or more rows of bores 212, 214, 216 are introduced into the sound absorption element 21. The rows of bores in each case extend so as to be transverse to the thickness direction 15 of the room delimitation element 10, and in the thickness direction 15 of the room delimitation element 10 are provided behind one another. The bores 212, 214, 216 of the sound absorption element 21 of the upper sound absorption region 20 have in each case a bore depth (in the vertical direction) of about 90 mm. The diameter of the bores 212, 214, 216 is about 5.5 mm, for example.

In a similar manner, the lower sound absorption region 22 has a sound absorption element 23 from a foam material, for example a closed-cell rigid foam. The sound absorption element 23 here likewise directly adjoins the door leaf 12, or is at least partially received in a clearance in the door leaf 12, which adjoins the through opening 14, respectively. One or more rows of bores 232, 234, 236 are introduced into the sound absorption element 23, wherein the rows of bores in each case extend so as to be transverse to the thickness direction 15 of the room delimitation element 10, and in the thickness direction 15 of the room delimitation element 10 are provided behind one another. The two outer bores 232, 236 of the sound absorption element 23 of the lower sound absorption region 22 have in each case a bore depth (in the vertical direction) of about 50 mm, and the inner bores 234 of the sound absorption element 23 of the lower sound absorption region 22 have in each case a bore depth (in the vertical direction) of about 30 mm. The diameter of the bores 232, 234, 236 is about 5.5 mm, for example.

In the case of the sound absorption elements 21, 23 of the upper and of the lower sound absorption regions 20, 22 being designed with bores 212, 214, 216, 232, 234, 236 having various bore depths, sound of various frequencies may be absorbed in the sound absorption elements 21, 23.

Since the sound absorption elements 21, 23 are disposed outside the air-passage region 18 of the insert 16, said sound absorption elements do not compromise the air passage.

As is indicated in FIGS. 2A and 2B, the sound reflection elements 184 may optionally additionally be coated with further sound absorption elements 19, for example from an open-cell foam material. The sound reflection elements 182, 183 of the other layer may optionally also be equipped with further sound absorption elements.

It is visualized in FIG. 2A that the insert 16 provides a sufficient available cross section in the through opening 14 of the room delimitation element 10, such that sufficient air can flow therethrough. As is illustrated by the flow arrows 30, the air in the region of the air-passage region 18 may flow through the openings 25, 27 in the two cover elements 24, 26, and the vacant spaces between the sound reflection elements 182, 183, 184 of the two layers. The insert 16 may thus be used as an incoming air opening for the supply of external fresh air (right in FIG. 2A) into the interior (left in FIG. 2A) of a sanitary room without windows to the outside (which can be opened), such as in a commercial aircraft, for example.

It is visualized in FIG. 2B that the insert 16 in the through opening 14 of the room delimitation element 10 ensures sufficient acoustic insulation, such that noises, such as flushing noises of a vacuum toilet in a sanitary room, for example, (left in FIG. 2B) do not make their way to the outside (right in FIG. 2B), or do so only in a damped manner.

As is indicated by the sound wave arrows 32 in FIG. 2B, part of the sound waves is already reflected at the cover element 24 on the inner side (left in FIG. 2B) of the room delimitation element 10, and at the first layer of the sound reflection elements 182, 183. Another part of the sound waves after multiple reflection between the reflection elements 182, 183, 184 of the two layers thus exits the cover element 26 on the outer side (right in FIG. 2B) of the room delimitation element 10 in an at least somewhat damped manner. A further proportion of the sound waves 32 ingressing the insert 16 is deflected by the sound reflection elements 182, 183, 184 in the air-passage region 18 in directions which are transverse to the thickness direction 15 of the room delimitation element 10, here in particular upwards and downwards towards the sound absorption regions 20, 22. The sound is then absorbed in the sound absorption regions 20, 22, in the bores 212, 214, 216, and 232, 234, 236 of the sound absorption elements 21, 23.

Figure 3:
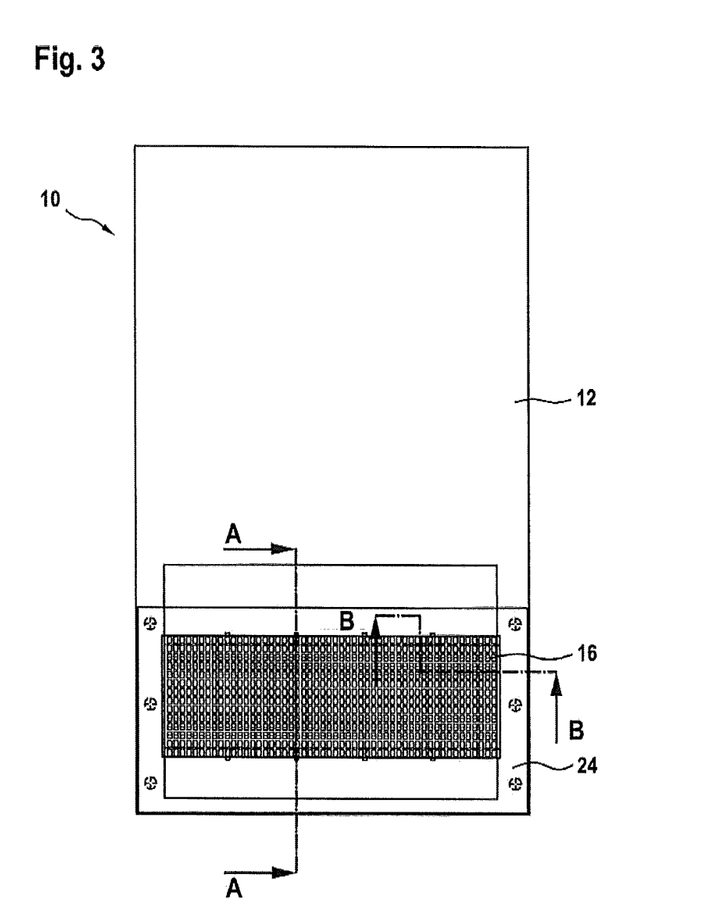
FIG. 3 shows a front view of a toilet door according to a first exemplary embodiment of the invention.
Figure 3A:
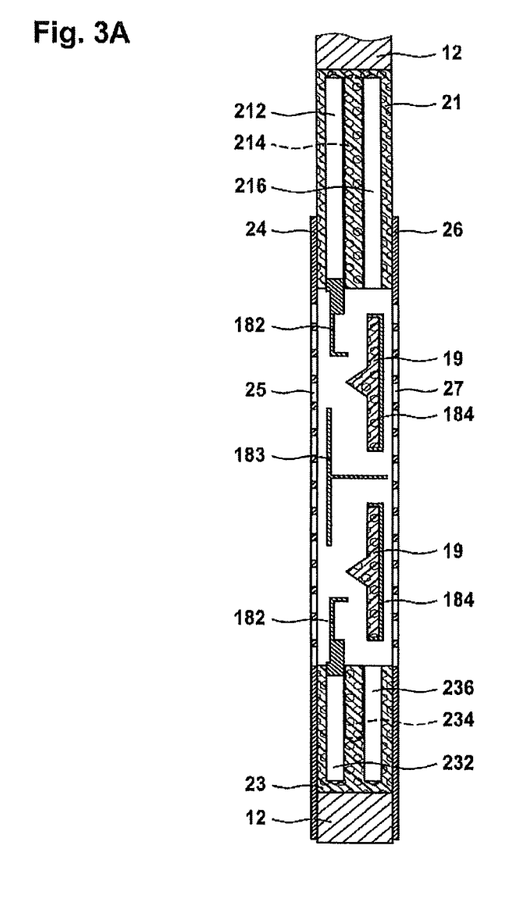
FIG. 3A shows a sectional view of the toilet door of FIG. 3, according to section A-A.
Figure 3B:
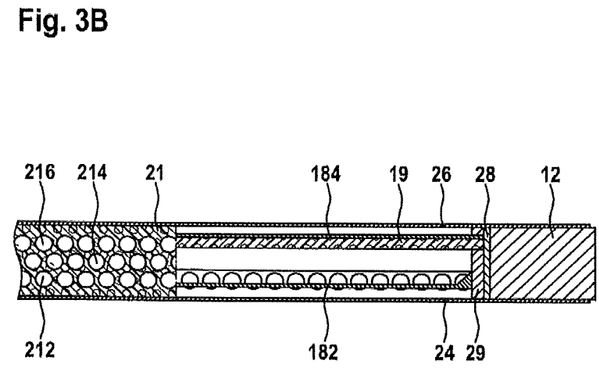
FIG. 3B shows a sectional view of the toilet door of FIG. 3, according to section B-B.

Referring to FIGS. 3, 3A, and 3B, a specific first exemplary embodiment of a toilet door will be described as a room delimitation element of the invention.

The construction of the insert 16 of this first exemplary embodiment substantially corresponds to the basic construction which has been explained by means of FIGS. 2A and 2B.

The insert has a first cover element 24 from stainless steel on the inner side of the room delimitation element 10 (left in FIG. 3A, bottom in FIG. 3B), and a second cover element 26 from stainless steel on the outer side of the room delimitation element 10 (right in FIG. 3A, top in FIG. 3B). These cover elements 24, 26 are provided with openings 25, 27 at least in the region of the air-passage region 18, and are thus designed in a grill-type manner. The air-passage region 18 of the insert 16 in the vertical direction (upward/downward direction in FIGS. 3 and 3A) has a height of about 164 mm, for example. The cover elements 24, 26 protrude beyond the air-passage region 18 on all sides.

The insert 16 in the air-passage region 18 has a first layer of sound reflection elements 182, 183 which are configured so as to be substantially plate-shaped, having a layer thickness of about 1 mm, for example, and are disposed behind the first cover element 24 so as to be spaced apart therefrom by about 2.5 mm and substantially parallel therewith. Furthermore, a second layer of sound reflection elements 164 which are likewise configured so as to be substantially plate-shaped, having a layer thickness of about 1 mm, for example, and are disposed behind the second cover element 26 so as to be spaced apart therefrom by about 2.5 mm and substantially parallel therewith. The sound reflection elements 182, 183 of the first layer in the vertical direction (upward/downward direction in FIG. 3A) are mutually spaced apart by about 23 mm, for example, and the sound reflection elements 184 of the second layer in the vertical direction (upward/downward direction in FIG. 3A) are mutually spaced apart by about 23 mm, for example, and are spaced apart from the sound absorption elements 21, 23 by about 11.5 mm, for example.

On that side that faces the first layer of sound reflection elements 182, 183, the sound reflection elements 184 of the second layer are provided or coated with further sound absorption elements 19 from an open-cell foam material, respectively. These further sound absorption elements 19 on the base have a layer thickness of about 3.5 mm, for example, and in the regions of the gaps between the sound reflection elements 182, 183 of the first layer have protrusions towards these gaps. In total, a vacant space having a width in the range of about 11.5 mm to 12.5 mm thus remains between the sound reflection elements 182, 183, 184 of the first and second layers.

The upper sound absorption region 20 has a sound absorption element 21 from a closed-cell rigid foam, which is provided with three rows of bores 212, 214, 216. The diameter of the bores 212, 214, 216 is in each case about 5.5 mm, for example, and the bore depth of the bores 212, 214, 216 is in each case about 90 mm, for example.

The lower sound absorption region 22 has a sound absorption element 23 from a closed-cell rigid foam, which is provided with three rows of bores 232, 234, 236. The diameter of the bores 232, 234, 236 is in each case about 5.5 mm, for example, the bore depth of the outer bores 232, 236 is in each case about 50 mm, for example, and the bore depth of the inner bores 234 is in each case about 32 mm.

While the air-passage region 18 of the insert 16 at the top and at the bottom adjoins in each case a sound absorption region 20 or 22, respectively, which in turn adjoins the door leaf 12 of the room delimitation element 10, as can be seen in FIG. 3A, the air-passage region 18 laterally by way of a buffer element 28 of a layer thickness of about 2 mm, for example, (directly, that is to say without interdisposed sound absorption regions) adjoins the door leaf 12, as can be seen in FIG. 3B. Plug pieces 29, by way of which the sound reflection elements 182, 184 are held in their respective positions are moreover provided in this lateral region.

Figure 4:
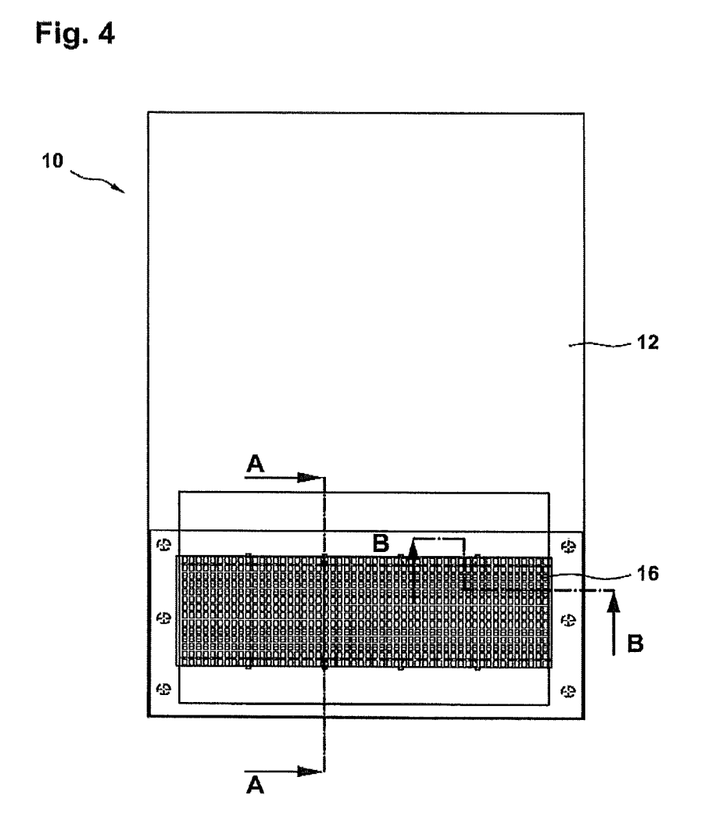
FIG. 4 shows a front view of a toilet door according to a second exemplary embodiment of the invention.
Figure 4A:
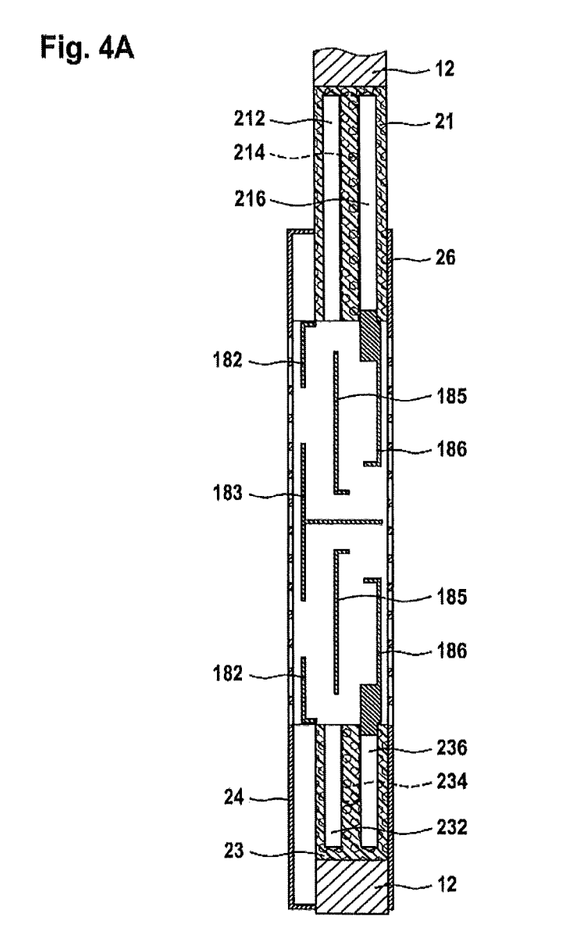
FIG. 4A shows a sectional view of the toilet door of FIG. 4, according to section A-A.
Figure 4B:
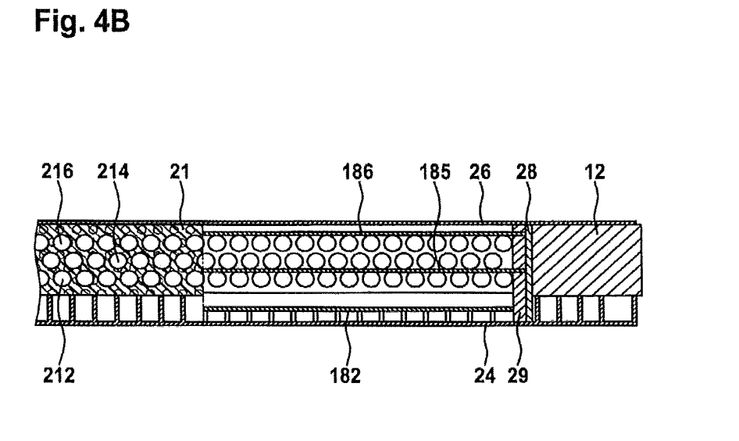
FIG. 4B shows a sectional view of the toilet door of FIG. 4, according to section B-B.

Referring to FIGS. 4, 4A, and 4B, a specific second exemplary embodiment of a toilet door as a room delimitation element of the invention will now be described.

Same or equivalent components are identified with the same reference numerals as in the first exemplary embodiment of FIGS. 3, 3A, and 3B. In the following, the differences in relation to the first exemplary embodiment above will be described in particular.

As opposed to the first exemplary embodiment, a total of three layers of sound reflection elements are disposed in the air-passage region 18 of the insert 16 of this exemplary embodiment. In order for the larger layer thickness of the insert 16 to thus be received in the air-passage region 18, the cover element 24 is placed on the inner side of the room delimitation element 10 (left in FIG. 4A, bottom in FIG. 4B) as an attachment onto the door leaf 12, having a spacing of about 10 mm, for example, and is preferably dimensionally stabilized using ribs (cf. FIG. 4B).

The first layer of sound reflection elements 182, 183 is configured so as to be substantially plate-shaped, having a layer thickness of about 1 mm, for example, and is disposed behind the first cover element 24 so as to be spaced apart therefrom by about 2.7 mm and substantially parallel therewith. The second layer of sound reflection elements 186 is configured so as to be substantially plate-shaped, having a layer thickness of about 1 mm, for example, and is disposed behind the second cover element 26 so as to be spaced apart therefrom by about 2.7 mm and substantially parallel therewith. The additional middle layer of sound reflection elements 185 is likewise configured so as to be substantially plate-shaped, having a layer thickness of about 1 mm, for example, and is disposed so as to be substantially centric between the first and the second layer and substantially parallel therewith. The sound reflection elements 185 of the middle layer are in each case spaced apart from the sound reflection elements 182, 183, 186 of the first and of the second layer by about 11.6 mm, for example.

As opposed to the first exemplary embodiment described above, in this second exemplary embodiment no sound reflection elements in the air-passage region 18 are equipped with any kind of further sound absorption elements 19. However, this is possible in principle also in the variant of embodiment of FIGS. 4, 4A, and 4B.

On account of having disposed a total of three layers of sound reflection elements, the effect of multiple reflection of the sound impacting on the insert 16 is reinforced. Therefore, sufficiently high sound damping can be achieved even without further sound absorption elements 19 in the region of the air-passage region 18.

In other aspects, the insert of this second exemplary embodiment corresponds to that of the first exemplary embodiment described above.

In both exemplary embodiments of FIGS. 3 to 4B, the sound absorption elements 21, 23 may optionally be integrated with the air-passage region 18, so as to form a constructive unit, such that this constructive unit as a whole may be installed in the through opening 14 in the room delimitation element 10. Alternatively, the air-passage region 18 and the sound absorption regions 20, 22 may also be provided as separate components and successively assembled in the through opening. In both variants, the sound absorption elements 21, 23 of the sound absorption regions 20, 20 may be inlaid and/or adhesively bonded into the adjoining door leaf 12, for example.

While in each case one upper and one lower sound absorption region 20, 22 have been provided for the insert 16 in the above exemplary embodiments, it is also possible in the context of the invention for only one sound absorption region to be provided in a manner adjoining the air-passage region 18, for the sound absorption region/s to be disposed laterally beside the air-passage region 18, for more than one air-passage region 18 to be provided, and so forth. Also, the cross-sectional shapes of the air-passage region 18 and of the entire insert 16 are not to be limited to the rectangular shapes of the exemplary embodiments described above.

What is claimed is:

1. A room delimitation element, comprising:
   a through opening, which extends through the entire room delimitation element in a thickness direction of the room delimitation element; and
   an insert, which is disposed in the through opening and which extends across the entire through opening in a transverse direction that is perpendicular to the thickness direction of the room delimitation element,
   wherein the insert comprises at least one air-passage region and at least one sound absorption region;
   wherein the at least one sound absorption region is disposed next to the air-passage region in a vertical direction, said vertical direction is perpendicular to the thickness direction and the transverse direction of the room delimitation element;
   wherein the at least one sound absorption region comprises at least one sound absorption element implementing a sound absorption effect in the vertical direction of the room delimitation element;
   wherein the at least one air-passage region comprises at least a first layer of a plurality of sound reflection elements and a second layer of a plurality of sound reflection elements spaced apart in the thickness direction of the room delimitation element;
   wherein the sound reflection elements of the first layer are mutually spaced apart in the vertical direction of the room delimitation element and the sound reflection elements of the second layer are mutually spaced apart in the vertical direction of the room delimitation element, such that a vacant space is provided between every two vertically adjacent sound reflection elements; and
   wherein the sound reflection elements of the first layer and the sound reflection elements of the second layer mutually offset and partially overlap one another in the vertical direction of the room delimitation element, such that no rectilinear passage extending through the insert is formed in the thickness direction of the room delimitation element.

2. The room delimitation element according to claim 1, wherein at least one of the sound reflection elements of the first layer or the second layer is configured in such a manner that said sound reflection element deflects sound in a direction towards the at least one sound absorption element of the at least one sound absorption region.

3. The room delimitation element according to claim 1, wherein at least one of the sound reflection elements of the first layer or the second layer is equipped with a further sound absorption element.

4. The room delimitation element according to claim 1, wherein the sound absorption element of the at least one sound absorption region is configured in such a manner that sound absorption in various frequency ranges is effected.

5. The room delimitation element according to claim 1, wherein the insert further comprises at least one cover element, said at least one cover element comprising a plurality of openings, and said at least one cover element being disposed on one side of the first layer of sound reflection elements and the second layer of sound reflection elements in the thickness direction of the room delimitation element.

6. The room delimitation element according to claim 5, wherein the at least one cover element protrudes beyond the through opening in the transverse direction of the room delimitation element.

7. The room delimitation element according to claim 1, wherein the room delimitation element comprises a door or a wall of a sanitary room.

8. An air-permeable insert for a through opening in a room delimitation element,
   wherein the insert is disposed in the through opening and extends across the entire through opening in a transverse direction that is perpendicular to the thickness direction of the room delimitation element,
   wherein the insert comprises at least one air-passage region and at least one sound absorption region;
   wherein the at least one sound absorption region is disposed next to the air-passage region in a vertical direction which is perpendicular to the thickness direction and the transverse direction of the room delimitation element;
   wherein the at least one sound absorption region comprises at least one sound absorption element implementing a sound absorption effect in the vertical direction of the room delimitation element;

wherein the at least one air-passage region comprises at least a first layer of a plurality of sound reflection elements and a second layer of a plurality of sound reflection elements spaced apart in the thickness direction of the room delimitation element;

wherein the sound reflection elements of the first layer mutually spaced apart in the vertical direction of the room delimitation element and the sound reflection elements of the second layer are mutually spaced apart in the vertical direction of the room delimitation element, such that a vacant space is provided between every two vertically adjacent sound reflection elements; and wherein the sound reflection elements of the first layer and the sound reflection elements of the second layer mutually offset and partially overlap one another in the vertical direction of the room delimitation element, such that no rectilinear passage extending through the insert is formed in the thickness direction of the room delimitation element.

* * * * *